United States Patent
Teraoka (10) Patent No.: US 9,314,863 B2
(45) Date of Patent: Apr. 19, 2016

(54) SOLDER HANDLING ASSEMBLY

(71) Applicant: Hakko Corporation, Osaka (JP)

(72) Inventor: Yoshitomo Teraoka, Osaka (JP)

(73) Assignee: Hakko Corporation, Osaka, Osaka (JP)

(*) Notice: Subject to any disclaimer, the term of this patent is extended or adjusted under 35 U.S.C. 154(b) by 479 days.

(21) Appl. No.: 13/666,745

(22) Filed: Nov. 1, 2012

(65) Prior Publication Data

US 2013/0105466 A1 May 2, 2013

(30) Foreign Application Priority Data

Nov. 2, 2011 (JP) ................................. 2011-241289

(51) Int. Cl.
*B23K 3/00* (2006.01)
*H05B 1/02* (2006.01)
*B23K 3/03* (2006.01)

(52) U.S. Cl.
CPC ..................................... *B23K 3/033* (2013.01)

(58) Field of Classification Search
CPC ......... B23K 3/033; B23K 3/0478; B23K 3/08
USPC ......... 219/241, 229, 501, 506, 494, 538, 227, 219/251
See application file for complete search history.

(56) References Cited

U.S. PATENT DOCUMENTS

| | | | | | |
|---|---|---|---|---|---|
| 2,060,951 | A | * | 11/1936 | Rae et al. | 200/43.11 |
| 2,611,259 | A | * | 9/1952 | Berry et al. | 70/284 |
| 3,234,814 | A | * | 2/1966 | Buckeridge | G04C 23/08 200/38 DA |
| 3,383,886 | A | * | 5/1968 | Hermann | 70/284 |
| 3,716,692 | A | * | 2/1973 | Schick et al. | 219/241 |
| 3,917,919 | A | * | 11/1975 | Tahara | 200/43.08 |
| 4,037,490 | A | * | 7/1977 | Wilson | H01H 3/20 116/320 |
| 4,053,077 | A | * | 10/1977 | DeFelice | 215/217 |
| 4,227,056 | A | * | 10/1980 | Johnston et al. | 200/43.11 |
| 4,455,847 | A | * | 6/1984 | Hung | 70/284 |
| 4,861,967 | A | * | 8/1989 | Yoshimura | 219/241 |
| 4,891,497 | A | * | 1/1990 | Yoshimura | 219/241 |
| 4,945,210 | A | * | 7/1990 | Yoshimura | 219/241 |
| 5,014,210 | A | * | 5/1991 | Postlewait et al. | 700/207 |
| 5,469,125 | A | * | 11/1995 | Shigemoto et al. | 338/162 |
| 5,928,536 | A | * | 7/1999 | Lee | 219/229 |

(Continued)

FOREIGN PATENT DOCUMENTS

| | | |
|---|---|---|
| JP | S57-114413 U | 7/1982 |
| JP | 1994-3003206 U | 8/1994 |

OTHER PUBLICATIONS

Taiyo Electric Ind. Co., Ltd, "Mini-Soldering Stations/Soldering Controllers PX-501, PX-601", 2 pages.

*Primary Examiner* — David Angwin
*Assistant Examiner* — Lawrence Samuels
(74) *Attorney, Agent, or Firm* — Squire Patton Boggs (US) LLP (57) ABSTRACT

A solder handling assembly comprises a heating portion, a casing, a variable resistor, a connecting member coupled to the variable resistor, and an elastic-resilient member movable from a first state to a second state. The connecting member is rotatable relative to the casing and is configured to adjust a resistor value of the variable resistor when the connecting member is rotated relative to casing. When the elastic-resilient member is in the first state, the connecting member is prevented from rotating relative to the casing. When the elastic-resilient member is in the second state, the connecting member can be rotated relative to the casing.

13 Claims, 11 Drawing Sheets

(56) References Cited

U.S. PATENT DOCUMENTS

| | | | |
|---|---|---|---|
| 6,093,915 A * | 7/2000 | Postlewait et al. | 219/494 |
| 6,404,354 B1 * | 6/2002 | Decker et al. | 341/35 |
| 6,833,531 B1 * | 12/2004 | Masaki | 219/241 |
| 7,860,378 B2 | 12/2010 | Teraoka | |
| 7,886,954 B2 | 2/2011 | Mochizuki | |
| 2004/0041012 A1 * | 3/2004 | Bezama et al. | 228/264 |
| 2004/0195292 A1 * | 10/2004 | Tetuo et al. | 228/51 |
| 2005/0121495 A1 * | 6/2005 | Yokoyama | 228/9 |
| 2009/0026176 A1 * | 1/2009 | Hobson et al. | 219/98 |
| 2009/0050673 A1 * | 2/2009 | Althoff et al. | 228/11 |
| 2010/0050325 A1 * | 3/2010 | Wang-Lee | 2/418 |

* cited by examiner

SOLDER HANDLING ASSEMBLY

FIELD OF THE INVENTION

This invention relates generally a solder handling assembly, more particularly, to a solder handling assembly with a temperature adjustment feature.

BACKGROUND

Examples of a solder handling assembly include, without limitation, a soldering iron having a tip to melt solder, a desoldering device, and a hot air device. A desoldering device may have a nozzle with a heater inside, and the nozzle is used to melt and remove solder from a work piece. A hot air device melts solder by applying hot air to the solder, and such a device can be used for both soldering and desoldering. These and other devices are referred to herein as solder handling assemblies. The handling of solder, whether to apply or remove solder, is referred to herein as a solder handling operation.

A solder handling operation is typically performed at an appropriate temperature which has been predetermined. The appropriate temperature can depend on several factors, such as the type of solder used, the type of solder handling assembly, the size and shape of the working tip on the solder handling assembly, and heat resistance of the component to be soldered or desoldered. There are conventional solder handling assemblies that have no temperature adjustment feature. Such non-adjustable solder handling assemblies are useful for maintaining manufacturing quality by requiring soldering handling operations to be performed at single temperature setting in accordance with predetermined manufacturing requirements.

Other solder handling assemblies have a temperature adjustment feature. With many conventional temperature adjustment features, it is possible for the person or operator to use an inappropriate temperature setting. For example, it often happens that the operator increases the temperature setting to a level that is higher than what is appropriate because a higher temperature makes it easier to melt solder and thereby speeds up the soldering handling operation. However, an unduly high temperature setting can damage the component being soldered or desoldered.

Efforts have been made to prevent an operator from using an inappropriate temperature setting. There is a need for a solder handling assembly with a temperature adjustment feature that allows for various modes in restricting adjustment.

SUMMARY OF THE INVENTION

Briefly and in general terms, the present invention is directed to a solder handling assembly.

In aspects of the present invention, a solder handling assembly comprises a heating portion, a casing, a variable resistor configured to change a temperature setting of the heating portion, a connecting member coupled to the variable resistor, and an elastic-resilient member movable from a first state to a second state. The connecting member is at least partially disposed within the casing, is rotatable relative to the casing, and is configured to adjust a resistor value of the variable resistor when the connecting member is rotated relative to casing. When the elastic-resilient member is in the first state, an engagement device coupled to the connecting member is engaged to an engagement device coupled to the casing, and the engagement prevents the connecting member from rotating relative to the casing. When the elastic-resilient member is in the second state, the engagement device coupled to the connecting member is disengaged from the engagement device, and the disengagement allows the connecting member to rotate relative to the casing.

In other aspects, elastic-resilient member is elastically deformed in the second state.

In other aspects, the connecting member includes a key receiving portion configured to receive, from outside the casing, a key projection having a shape that mates with the key receiving portion.

In other aspects, the connecting member includes a boss, the key receiving portion is a slot in the boss, and the slot is configured to receive the key projection.

In other aspects, the casing forms a grip.

In other aspects, the elastic-resilient member is in the form of an arm attached to the connecting member, the engagement device coupled to the connecting member is disposed at an end of the arm.

In other aspects, the engagement device coupled to the casing includes a plurality of latch elements, the engagement device coupled to the connecting member includes a lock element configured to engage the latch elements on an individual basis when the connecting member is rotated relative to the casing, and the latch elements correspond to different temperature settings of the heating portion. In further aspects, the lock element is a projection, and each latch element is a recess configured to receive the projection.

In other aspects, the engagement device coupled to the connecting member includes a plurality of latch elements, the engagement device coupled to the casing includes a lock element configured to engage the latch elements on an individual basis when the connecting member is rotated relative to the casing, and the latch elements correspond to different temperature settings of the heating portion. In further aspects, the lock element is projection, and each latch element is a recess configured to receive the projection.

In other aspects, the solder handling assembly further comprises a second engagement device coupled to the connecting member, and a second engagement device coupled to the casing. The second engagement device coupled to the connecting member and the second engagement device coupled to the casing provide detents in rotation of the connecting member relative to the casing, and each detent is a change in rotating resistance in the rotation of the connecting member relative to the casing.

In other aspects, the second engagement device coupled to the casing includes a plurality of second latch elements, the second engagement device coupled to the connecting member includes a second lock element configured to engage the second latch elements on an individual basis when the connecting member is rotated relative to the casing, and the second latch elements correspond to different temperature settings of the heating portion.

In other aspects, the second engagement device coupled to the connecting member includes a plurality of second latch elements, the second engagement device coupled to the casing includes a second lock element configured to engage the second latch elements on an individual basis when the connecting member is rotated relative to the casing, and the second latch elements correspond to different temperature settings of the heating portion.

In other aspects, the solder handling assembly further comprises an operating member that includes a key projection configured to push the elastic-resilient member from the first state to the second state.

In other aspects, the operating member is configured to be attached to and removed from the connecting member.

In other aspects, the operating member is a knob attached to the connecting member, and the casing is disposed between a portion of the knob and a portion of the connecting member.

In other aspects, the knob is fixed at a state in which the key projection continually pushes the elastic-resilient member to the second state.

In other aspects, the solder handling assembly further comprises a screw that fixes the knob at the state in which the key projection continually pushes the elastic-resilient member to the second state.

The features and advantages of the invention will be more readily understood from the following detailed description which should be read in conjunction with the accompanying drawings.

DETAILED DESCRIPTION OF THE INVENTION

As used herein, the words "operator" and "user" are used interchangeably and refer to a person that is operating or using a subject device.

As used herein, the phrases "integrally formed", "integrally provided", and the like mean that the subject structures are a unitary construct of the same material, and there is no intervening connector that fixes the structures together. For example, a first structure that is integrally formed with a second structure can be the result of injection molding and/or a milling operation.

As used herein, the phrase "coupled to" means that the subject structures are attached together in such a way that the structures move simultaneously together in one or more directions. For example, a first structure that is coupled to a second structure is attached, either directly or indirectly via an in intervening connector, to the second structure so that the first structure rotates when the second structure is rotated. The first structure may or may not be integrally formed on the second structure.

Figure 1:
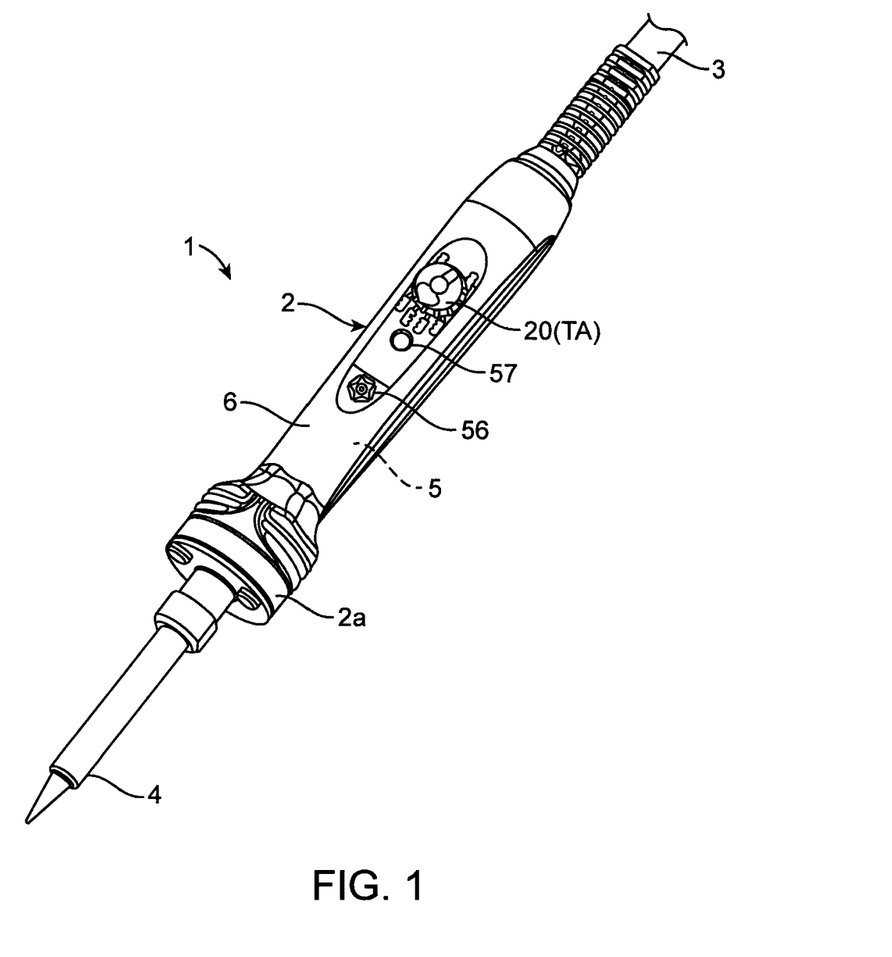
FIG. 1 is a perspective view showing a solder handling assembly in the form of a soldering iron.

Referring now in more detail to the exemplary drawings for purposes of illustrating embodiments of the invention, wherein like reference numerals designate corresponding or like elements among the several views, there is shown in FIG. 1 soldering iron 1 as a non-limiting example of a solder handling assembly in some embodiments of the present invention. Other examples of solder handling assemblies within the scope of the present invention include without limitation desoldering devices and hot air devices.

Soldering iron 1 includes grip 2, power cord 3 extending from the proximal part of grip 2, tip 4 extending out from the distal part of grip 2, temperature adjustment feature TA for adjusting the temperature of tip 4, power indicator 56, and calibrator 57.

Grip 2 has a hollow cylinder-like shape. Grip 2 has a two-layered structure (see FIG. 8) that includes inner casing 5 and outer casing 6 enclosing inner casing 5. Inner casing 5 contains control circuitry and a variable resistor 7 discussed below. The distal end of grip 2 is formed with concentric enlarged diameter portion 2a to shield the operator from heat. Tip 4 extends forward from enlarged diameter portion 2a.

Although hidden from view, soldering iron 1 includes a heating element configured to heat tip 4. The heating element is controlled by control circuitry on a circuit board in inner casing 5. Tip 4 is an example of a heating portion to melt the solder in some embodiments of the present invention. A temperature sensor (hidden from view) is disposed within tip 4.

Power indicator 56 is a light emitting diode (LED) which illuminates when power is supplied to the control circuitry from power cord 3.

Calibrator 57 is operated to calibrate the control circuitry by determining the difference between the actual temperature of a controlled subject and the displayed and marked temperature setting.

Some elements of temperature adjustment feature TA are located inside grip 2. The control circuitry senses, via the temperature sensor, the temperature or temperature related information, such as the voltage, which allows for temperature control of tip 4. Temperature adjustment feature TA includes knob 20. The operator prepares to set the target temperature of tip 4 by manually operating knob 20. The control circuitry compares the information sent from the temperature sensor with a target temperature, and adjusts the power supplied to the heating element so the temperature of tip 4 is brought to the target temperature desired by the user.

Temperature adjustment feature TA includes variable resistor 7 (see FIG. 2) which is operated by knob 20 via knob below member 10.

Figure 2:
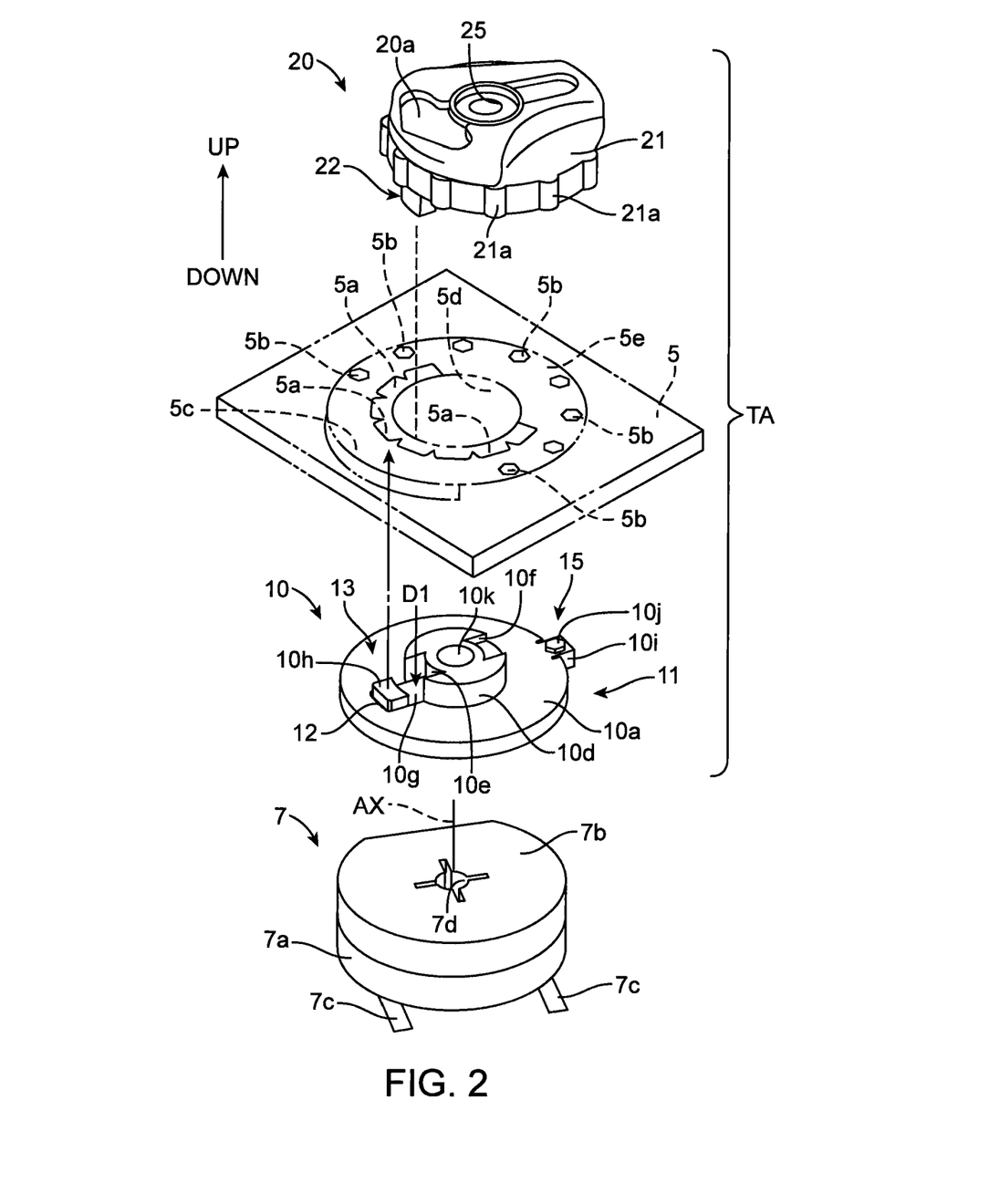
FIG. 2 is an exploded perspective view showing a temperature adjustment feature viewed from above.

Referring to FIG. 2, variable resistor 7 includes main body 7a and a rotating member 7b. Main body 7a houses a resistor board having a resistor pattern. Rotating member 7b is rotatably attached on the top of main body 7a. Main body 7a has terminal 7c, which can for example be two electrical contacts. Terminal 7c is connected to the control circuitry inside inner casing 5. When a rotational force is applied from outside of the inner casing 5 to rotating member 7b, rotating member 7b is rotated on axis AX. Rotating member 7b can rotate in both directions and thereby move to various angular positions centered on axis AX. Rotating member 7b has a wiper that is in sliding contact with the resistor pattern in main body 7a. The wiper contact position changes according to the angular position of rotating member 7b about axis AX (also referred to as the rotational axis). A change in angular position changes the resistor value of variable resistor 7. Cross hole 7d is formed in the top of rotating member 7b and receives a rotational force from connecting projection 10c (FIG. 3) that fits within cross hole 7d.

Variable resistor 7 is not limited to the example of FIG. 2. Other types of variable resistors can be used, such as one with an axial handling portion.

Knob below member 10 operates variable resistor 7. Knob below member 10 is a component integrally provided with connecting member 11 and arm 10g. Arm 10g is an example of an elastic-resilient member in some embodiments of the invention.

Figure 3:
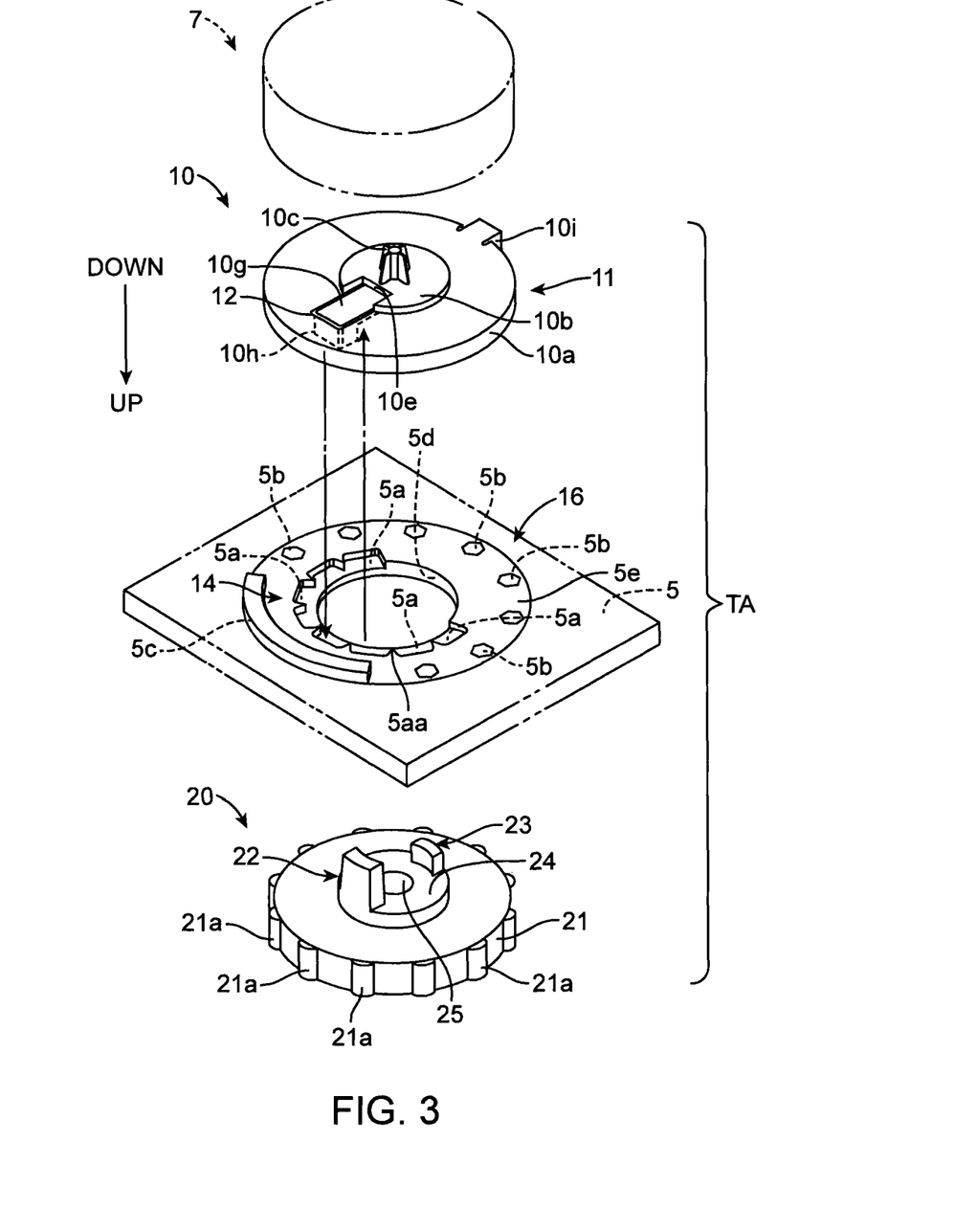
FIG. 3 is an exploded perspective view showing the temperature adjustment feature of FIG. 2 viewed from below.

In some embodiments, knob below member 10 is a single, unitary piece in which all elements on knob below member 10 shown in FIG. 2 and FIG. 3 are integrally formed together. In alternative embodiments, one or more of the elements on knob below member 10 are separately formed and are later secured together.

Referring to FIG. 2 and FIG. 3, connecting member 11 includes disk shaped body 10a, seating portion 10b formed on the bottom of body 10a, connecting projection 10c protruding out from seating portion 10b, and boss 10d formed on the top of body 10a. In FIG. 2 and FIG. 3, the vertical arrow at the left hand side of the figures has an arrow head that points in the upward direction. Seating portion 10b (FIG. 3) is a disk shaped feature that is concentric with body 10a and bulges slight downward. Seating portion 10b abuts rotating member 7b of variable resistor 7.

Connecting projection 10c is cross-shaped and mates with the shape of cross hole 7d of rotating member 7b of variable resistor 7. Connecting projection 10c engages hole 7d while seating portion 10b abuts rotating member 7b. This engagement couples knob below member 10 to rotating member 7b of variable resistor 7. A change in the rotational angle or position causes a change in the resistor value of variable resistor 7.

Boss 10d is concentric with body 10a and protrudes upward from the top of body 10a. Boss 10d is formed with first keyhole 10e and second keyhole 10f. Keyholes 10e and 10f are aligned along the diameter direction and face each other. Each of keyholes 10e and 10f has openings on the top surface and the side surface of boss 10d. Keyholes 10e and 10f are examples of a key receiving portion.

Connecting member 11 is formed with opening 12 extending radially out from first keyhole 10e. Arm 10g is located and able to move within opening 12. Arm 10g extends radially out and has a shape that follows the outline of opening 12. The radially inside end of arm 10g is fixed and formed integrally to boss 10d, and the radially outside end of arm 10g is movable. Arm 10g is supported only on its inside end. Arm 10g is an example of a resilient-elastic portion in some embodiments of the present invention. Arm 10g, as will be explained below, works to lock knob below member 10 at a rotational angle corresponding to the desired temperature setting.

Figure 5:
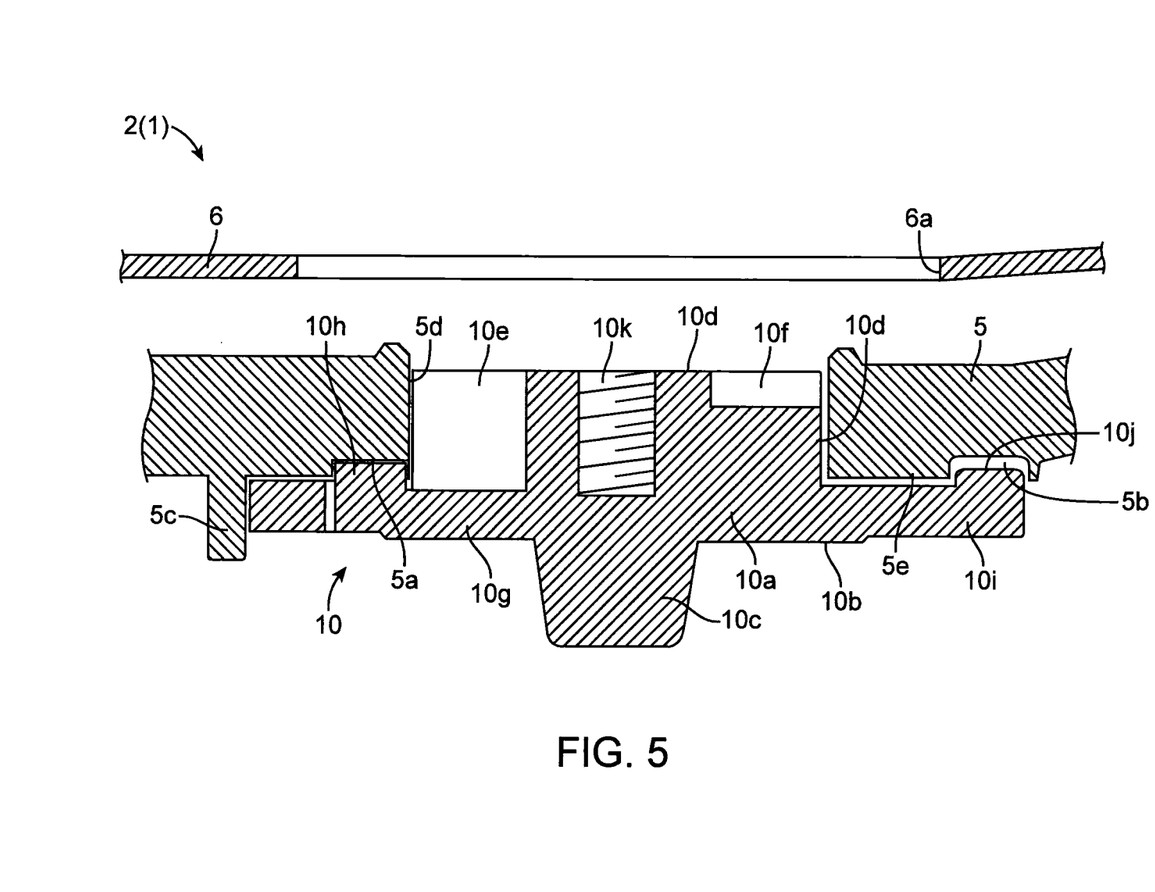
FIG. 5 is a cross-section view showing components of the temperature adjustment feature of the soldering iron of FIG. 1.

FIG. 5 shows arm 10g at a free state in which arm 10g is flush with body 10a and extends along in the diameter direction of boss 10d. Arm 10g is configured to elastically deform. A person can use an operating member, which can for example be knob 20 or temperature adjusting handle 40 (FIG. 9) or other structure, to push arm 10g via first keyhole 10e in axial direction D1 (FIG. 2) of body 10a. Pushing arm 10g will elastically deform arm 10g so that arm 10g may bend to a deformed state and the radially outside end of arm 10g moves downward. Projection 10h is attached to the top of the radially outside end of arm 10g. Projection 10h is an example of a lock element in some embodiments of the present invention. When arm 10g is at the free state, projection 10h protrudes upward from body 10a. When arm 10g is being pushed, arm 10g will bend down and projection 10h moves into opening 12 formed in body 10a.

In some embodiments, the free state of arm 10g is an example of a first state of an elastic-resilient portion, and the deformed state of arm 10g is an example of a second state of an elastic-resilient portion.

Connecting member 11 includes engagement device 13 (FIG. 2) that engages and disengages engagement device 14 (FIG. 3) coupled to inner casing 5. Whether disengagement or engagement occurs depends on whether an elastic-resilient member, such as arm 10g, is pushed or not pushed, respectively. When engaged, connecting member 11 is prevented from rotating relative to inner casing 5, which prevents a change in the temperature setting of tip 4 or other type of heating portion. When disengaged, connecting member 11 can be rotated relative to inner casing 5, which allows a change in the temperature setting of tip 4 or other type of heating portion.

Figure 4:
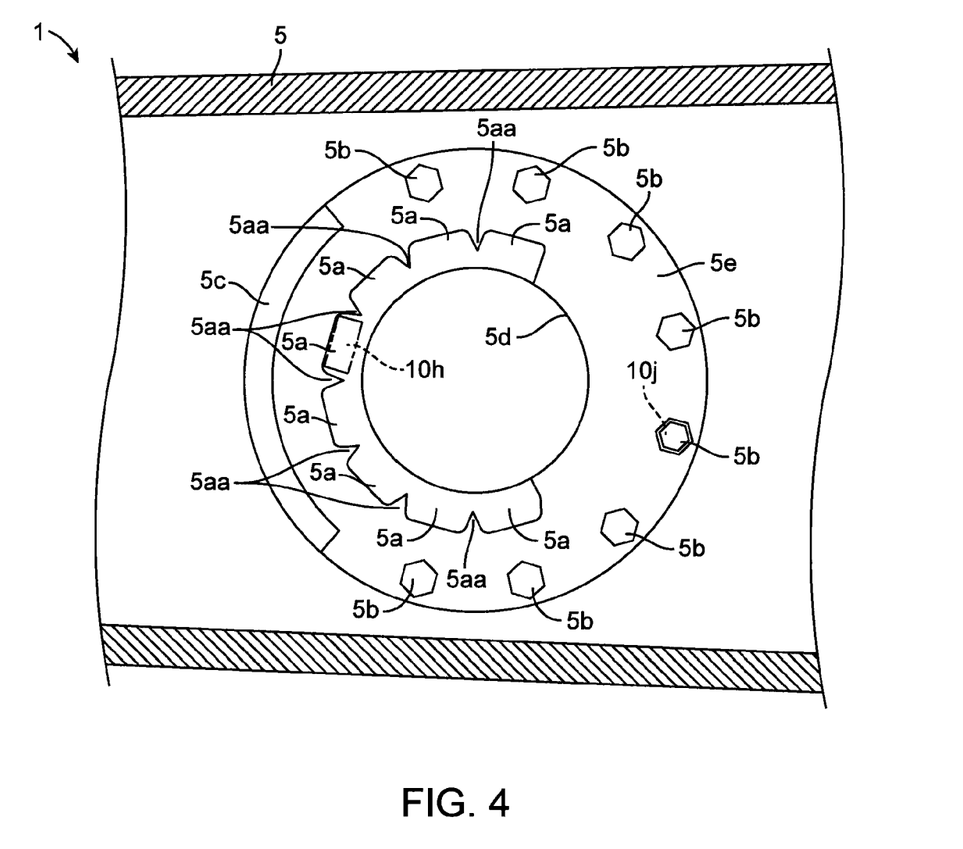
FIG. 4 is an internal plan view showing the underside or interior of an inner casing of the soldering iron of FIG. 1.

In the illustrated embodiment of FIG. 2 and FIG. 3, engagement device 14 coupled to inner casing 5 includes a plurality of latch elements. Each latch elements can be in the form of a recess 5a. The recesses 5a are defined in part by recess ribs 5aa (FIG. 4). Recess ribs 5aa extend radially inward and are configured to prevent projection 10h from moving from one recess 5a to another recess 5a when arm 10g has not been pushed downward and bent. Engagement device 13 coupled to connecting member 11 includes a lock element. The lock element is in the form of singular projection 10h configured to mate with each recess 5a individually.

In another embodiment, the latch elements coupled to inner casing 5 are in the form projections instead of recesses, and the lock element coupled to connecting member 11 is in the form of a singular recess instead of a singular projection.

In other embodiments, the engagement device coupled to inner casing 5 includes a singular latch element, and the engagement device coupled to connecting member 11 includes a plurality of lock elements. Each lock element, which can be either a recess or a projection, is configured to mate with the latch element. The latch element is a singular projection when the lock elements are recesses. Alternatively, the latch element is a singular recess when the lock elements are projections.

In the illustrated embodiments, connecting member 11 includes second engagement device 15 (FIG. 2) that engages second engagement device 16 (FIG. 3) coupled to inner casing 5. Engagement occurs regardless of whether an elastic-resilient member, such as arm 10g, is pushed or not pushed. Second engagement devices 15 and 16 provide detents in rotation of connecting member 11 relative to inner casing 5.

When second engagement devices 15 and 16 go from disengaged to engaged, there is an increase in resistance to rotation of connecting member 11 relative to inner casing 5 although rotation is not prevented. When second engagement devices 15 and 16 go from engaged to disengaged, there resistance to rotation decreases. These changes in rotational resistance correspond to detents in rotation of connecting member 11 relative to inner casing 5. The detents provide a tactile signal or indication to the user that the temperature setting has changed from a predetermined temperature setting to another predetermined temperature setting.

In the illustrated embodiment of FIG. 2 and FIG. 3, second engagement device 16 coupled to inner casing 5 includes a plurality of second latch elements. Each one of the second latch elements is in the form of hexagonal recess 5b. Second engagement device 15 coupled to connecting member 11 includes a second lock element. The second lock element is in the form of singular hexagonal projection 10j configured to mate with each hexagonal recess 5b individually. It will be appreciated that geometric shapes other than hexagonal can be implemented.

In another embodiment, the second latch elements coupled to inner casing 5 are in the form projections instead of recesses, and the second lock element coupled to connecting member 11 is in the form of a singular recess instead of a singular projection.

In other embodiments, the second engagement device coupled to inner casing 5 includes a second latch element, and the second engagement device coupled to connecting member 11 includes a plurality of second lock elements. Each one of the second lock elements, which can be either a recess or a projection, is configured to mate with the second latch element. The second latch element is a singular projection when the second lock elements are recesses. Alternatively, the second latch element is a singular recess when the second lock elements are projections.

Referring to FIG. 4 and FIG. 5, when connecting member 11 is assembled to variable resistor 7 inside inner casing 5, projection 10h may engage and latch on to one of multiple recess 5a formed on the inward facing surface of inner casing 5. Each recess 5a is an example of a latch element in some embodiments of the present invention. Each recess 5a functions to prevent connecting member 11 from rotating relative to inner casing 5 and to lock connecting member 11 at any one of multiple angular positions that correspond to different temperature settings. Recesses 5a are positioned every thirty degrees on the circumference centered on axis AX of rotating member 7b. Projection 10h will engage recesses 5a individually, meaning one at a time, as connecting member 11 rotates within the rotating range of rotating member 7b. When projection 10h engages one of recess 5a, rotation of connecting member 11 is prevented. Therefore, rotating member 7b, in combination with connecting member 11, will be locked against movement relative to main body 7a of variable resistor 7. Thus, when projection 10h engages one of recess 5a, the temperature setting is fixed and prevented from changing, which provides a reliable temperature lock function. Arm 10g, on which projection 10h is attached, is an elastic member that can be bent downward so that projection 10h disengages from recess 5a. With this disengagement of projection 10h, connecting member 11 is free to be rotated by the user in both circumferential directions.

Referring to FIG. 2 through FIG. 5, bump 10i is formed in the outer circumference or the periphery of body 10a. Bump 10i is located diametrically opposite from arm 10g. Bump 10i is flexible. A slit is formed into body 10a on both sides of bump 10i. The slits allow bump 10i to bend in the axial direction of body 10a. Hexagonal projection 10j is formed on the top of bump 10i. Hexagonal projection 10j is an example of a second lock element in some embodiments of the present invention.

Hexagonal recesses 5b are formed into the inward facing surface of inner casing 5. The inward facing surface faces toward body 10a of knob below member 10. Hexagonal recesses 5b correspond in number to recesses 5a. Each of hexagonal recesses 5b is located diametrically opposite or face diagonally opposite a corresponding one of recesses 5a. Hexagonal projection 10j is configured to fit in each one of hexagonal recesses 5b. Each hexagonal recess 5b is an example of a second latch element in some embodiments of the present invention. The engagement and disengagement of hexagonal projection 10j and hexagonal recesses 5b are further explained below.

When projection 10h is disengaged from recess 5a, knob below member 10 is free to be rotated. When knob below member 10 is rotated, hexagonal projection 10j receives a rotational force and conveys the rotational force to bump 10i. Bump 10i bends in response to the rotational force. When bump 10i bends, hexagonal projection 10j disengages and moves out from the hexagonal recess 5b in which hexagonal projection 10j was previously located. With hexagonal projection 10j removed from hexagonal recess 5b, hexagonal projection 10j presses against the inward facing surface of inner casing 5. Bump 10i is biased to return to its unstressed or unbent position. With continued rotation of knob below member 10, projection 10h engages the next recess 5a and, simultaneously, hexagonal projection 10j enters the next hexagonal recess 5b. The engaging and disengaging action of hexagonal projection 10j and hexagonal recess 5b gives the operator a clicking feel or tactile indication, which facilitates adjustment of the temperature setting by allowing the operator to sense the rotational position of knob below member 10.

Even when projection 10h and recess 5a are subsequently disengaged, such as by pushing arm 10g, hexagonal projection 10j and hexagonal recess 5b remain engaged so as to provide the operator with tactile indication of any change in rotational position. The tactile indication provided by hexagonal projection 10j and hexagonal recess 5b reduces the possibility of the operator unknowingly changing the temperature setting, which further improves the process of adjusting the temperature setting.

Rib 5c is formed on the inward facing surface of inner casing 5. Rib 5c abuts the outer circumference or the peripheral edge of knob below member 10. Both ends of rib 5c restrict or impose limits in the range of rotation of knob below member 10. The rotational limit is reached when bump 10i hits either end of rib 5c when knob below member 10 is rotated.

Opening 5d is formed through inner casing 5. Boss 10d of knob below member 10 is disposed within opening 5d. Opening 5d is sized and shaped to allow boss 10d to pass through and rotate within opening 5d. Opening 5d is sized and shaped so that only boss 10d is exposed through opening 5d, and other parts of knob below member 10 are not exposed or visible from the exterior of inner casing 5. The top surface of boss 10d is slightly lower in elevation than the top surface of opening 5d, as shown in FIG. 5.

As shown in FIG. 3 to FIG. 5, thin portion 5e of inner casing 5 surrounds and is concentric with opening 5d. Thin portion 5e has a thickness, measured in the axial direction, that is less than other parts of inner casing 5 located further away in the radial direction from opening 5d. Recesses 5a, hexagonal recesses 5b, and rib 5c are formed in or on thin portion 5e.

In the illustrated embodiments, thin portion 5e is integrally formed with inner casing 5. In alternative embodiments, thin portion 5c is formed separately from inner casing 5 and then secured to inner casing 5.

Figure 6:
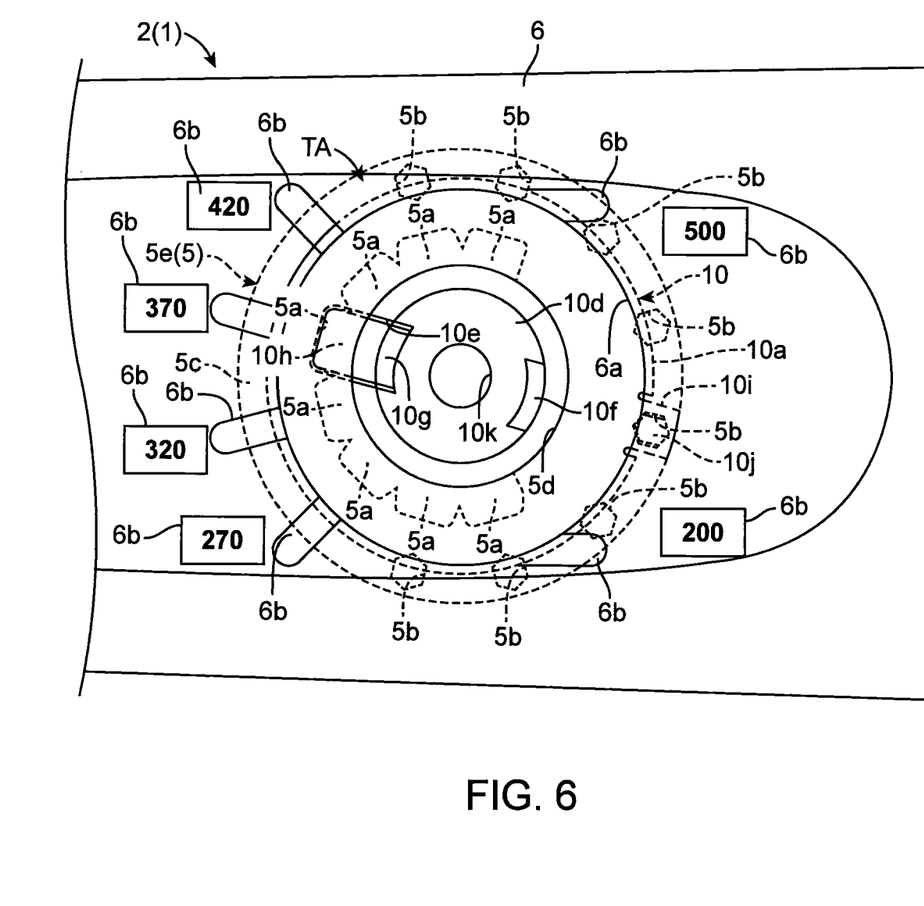
FIG. 6 is an external plan view of an area of the soldering iron of FIG. 1 which contains the temperature adjustment feature.
Figure 7:
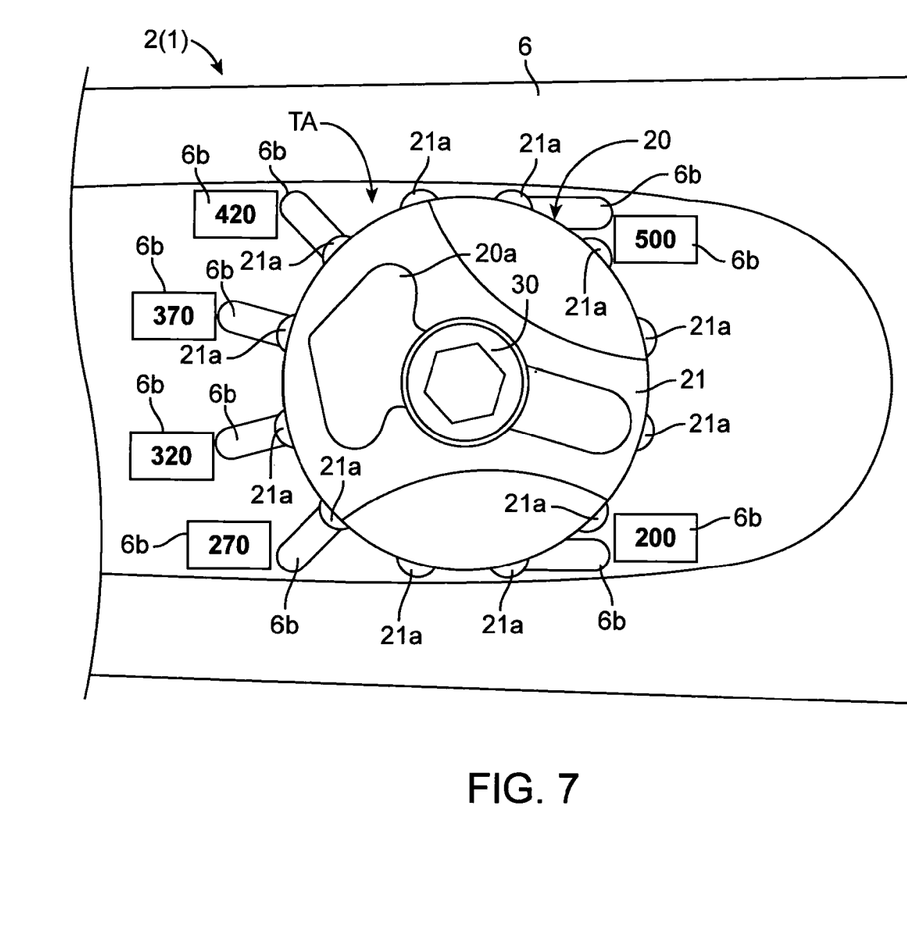
FIG. 7 is an external plan view of the area of FIG. 6 including a knob for adjusting temperature.

Referring to FIG. 5 and FIG. 6, mounting opening 6a is formed through outer casing 6 of grip 2. Mounting opening 6a is concentric with opening 5d. Mounting opening 6a is shaped and sized to allow a portion of knob 20 to pass through and attach to knob below member 10. Markings 6b (FIG. 6 and FIG. 7) are printed or embossed around opening 6a to indicate temperature settings that can be achieved by variable resistor 7. There is one marking 6b for each recess 5a. Each marking 6b can be a numerical value of the temperature setting and/or a visual indication to align the rotational position of knob 20. When the operator rotates knob 20 so that mark 20a on knob 20 is aligned with one of markings 6b, connecting member 11 rotates to a predetermined angular position about the rotational axis. The predetermined angular position of connecting member 11 corresponds to the temperature setting indicated by marking 6b and results in the appropriate resistance value of variable resistor 7 that will achieve the temperature setting in tip 4.

In some embodiments of the present invention, knob 20 is an example of an operating member that is attached to and removable from connecting member 11. Knob 20 is attached to boss 10d which is a part of connecting member 11.

Referring to FIG. 2, FIG. 3, FIG. 7, and FIG. 8, knob 20 has disc shaped knob body 21, the top of which is rounded or chamfered. Marking 20a is embossed on knob 20. Through hole 25 is formed through the center of knob body 21 and concentric with threaded hole 10k formed through boss 10d of connecting member 11. Knob 20 is attached and concentric with boss 10d when screw 30 is installed from the top of knob body 21 and into through hole 25 so that screw threads engage threaded hole 10k. Screw 30 can be a hexagon socket stud-type bolt.

Figure 8:
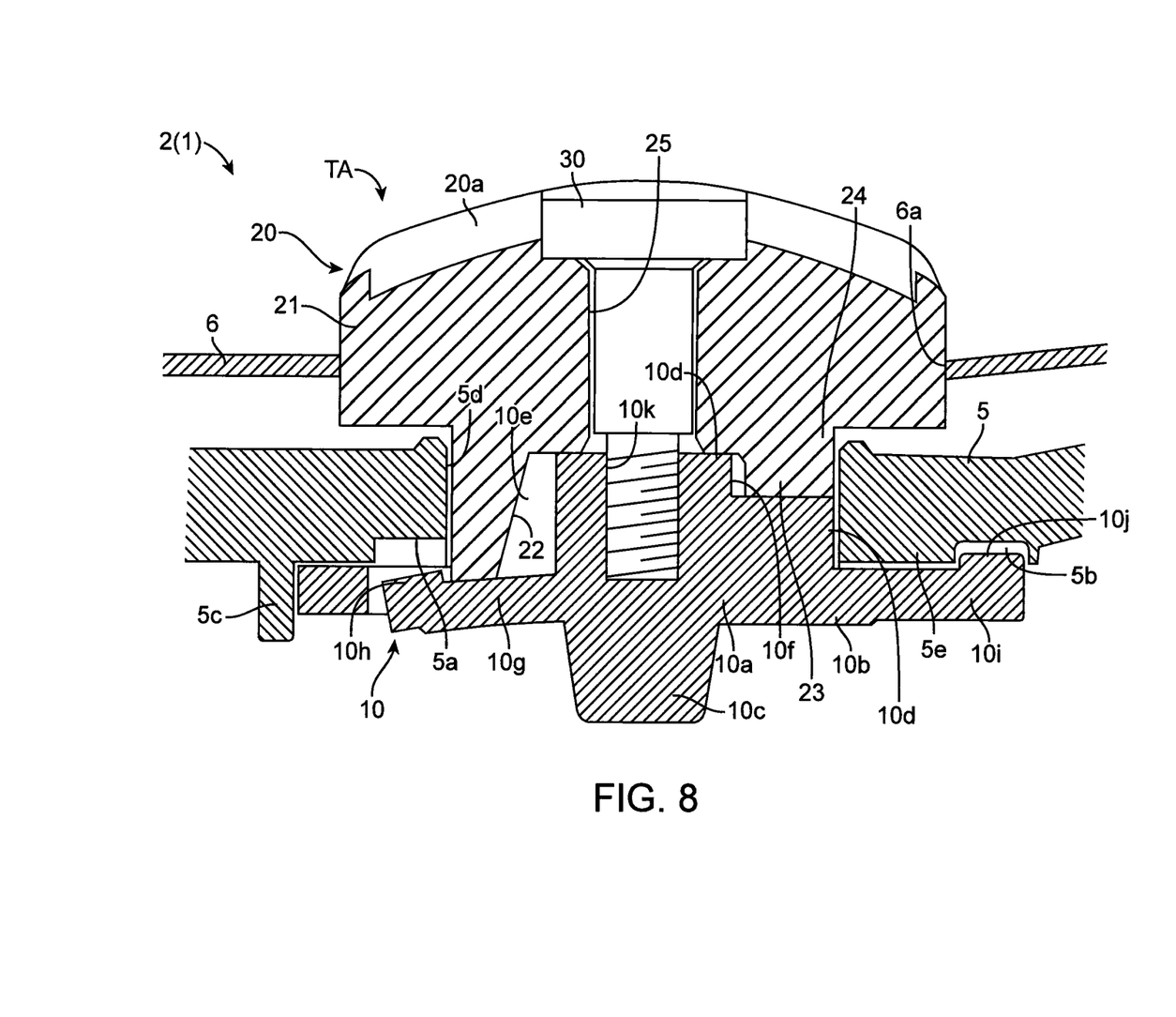
FIG. 8 is a cross-section view of the area of FIG. 7 showing components of the temperature adjustment feature.

First key projection 22 and second key projection 23 are integrally formed on the bottom of knob body 21. Second key projection 23 is positioned diametrically opposite first key projection 22. As shown in FIG. 8, knob 20 is attached to boss 10d of connecting member 11, first key projection 22 enters first keyhole 10e and presses or pushes arm 10g downward. In some embodiments of the present invention, first key projection 22 is an example of a certain shaped member, and first keyhole 10e is an example of a key receiving portion.

Second key projection 23 is formed to engage second keyhole 10f. As a result of first key projection 22 pressing down arm 10g, knob below member 10 is able to rotate. Both key projections 22 and 23 enter keyholes 10e and 10f respectively, and the rotational force applied by the operator to knob 20 is conveyed to knob below member 10 via boss 10d of connecting member 11 and is conveyed to rotating member 7b attached to knob below member 10. As a result, the resistor value of variable resistor 7 is changed by rotating knob 20.

The opening area of first keyhole 10e is larger than the opening area of second keyhole 10f. The section area of first key projection 22 is larger than the section area of second key projection 23, which makes sure that first key projection 22 will always engage first keyhole 10e instead of the second keyhole 10f.

Cylindrical portion 24 (FIG. 3 and FIG. 8) is formed on the bottom of knob body 21. First key projection 22 and second key projection 23 extend downward from the bottom surface of cylindrical portion 24. Cylindrical portion 24 has the same diameter as boss 10d of connecting member 11. When knob 20 is attached to connecting member 11, the bottom part of cylindrical portion 24 fits in opening 5d of inner casing 5 and abuts the top surface of boss 10d. Opening 5d functions as a bearing of cylindrical portion 24 and stabilizes knob 20 during rotation.

Ribs 21a are formed on the outer circumference of knob body 21. Each rib 21a extends in the axial direction of knob body 21. Ribs 21a help the operator grasp knob 20 by reducing the possibility of slipping between the operator's fingers and knob 20.

It will be appreciated from the above description that a low number of components are used to make a lockable temperature adjustment feature. Embodiments of the present invention have a temperature setting adjustment feature that is easier to operate compared to a conventional solder handling assembly that requires selection of an individual resistor from among many resistors. Because connecting member 11—which includes body 10a, connecting projection 10c, and boss 10d—is contained within the casing, no component of the temperature setting adjustment feature need protrude out from the casing. This is the case when knob 20 has been removed from soldering iron 1. Protruding components could interfere with a solder handling operation.

It will also be appreciated that the temperature setting adjustment feature of the present invention does not require a special cover to prevent unauthorized changes to the temperature setting. Removal of knob 20 prevents unauthorized changes in temperature setting in some embodiments. Components for locking the temperature setting are contained within the casing. Here, arm 10g has a structure that, at the free state, keeps connecting member 11 locked against rotation, but when arm 10g is elastically deformed by being push in, connecting member 11 is unlocked and can be rotated. First keyhole 10e is formed so it only allows passage of the certain shaped member to push in arm 10g from outside of the casing. This configuration reduces the possibility that arm 10g will be pushed in by mistake and reduces the possibility that the operator can make a change in temperature setting without authorization. The described features make locking of the temperature setting more reliable. The lock can be unlocked with the certain shaped member (for example, first key projection 22 of knob 20), which is more convenient than having to remove a special cover to gain access to an adjustment knob.

There is a one-versus-plurality relationship between projection 10h and recesses 5a. In the illustrated embodiments, the is a one-versus-eight relationship such that there is a single projection 10h that engages and disengages eight recesses 5a to provide eight different temperature settings. Each recess 5a is formed at position at which projection 10h gets latched at incremental angles or rotational positions with rotation of connecting member 11 relative to the casing. Each position corresponds to a different temperature setting, which makes the process of setting the temperature of tip 4 to a desired temperature easier and more reliable. It will be appreciated that the number of positions and, thus, the number of temperature settings can be any number other than eight.

Hexagonal projection 10j engages hexagonal recesses 5b at rotational positions of connecting member 11 to provide the operator a tactile indication when the temperature setting is changed from one value to the next.

There is a one-versus-plurality relationship between hexagonal projection 10j and hexagonal recesses 5b. In the illustrated embodiments, there is a one-versus-eight relationship such that there is one hexagonal projection 10j that engages and disengages eight hexagonal recesses 5b at eight different temperature settings. It will be appreciated that the numerical relationship can be other than one-versus-eight.

In some embodiments, knob 20 is kept attached to knob below member 10. This configuration mode can be appropriate when there is no need to prevent unauthorized changes to the temperature setting, such as when the solder handling assembly is for personal or home use.

Optionally as shown in FIG. 8, knob 20 can be fixed on connecting member 11 such that first key projection 22 continuously pushes down arm 10g and causes projection 10h to disengage from recess 5a. As a result, arm 10g is continuously held at its deformed state. With knob 20 fixed in this way, the temperature setting may be changed whenever desired by the operator.

Soldering iron 1 may be sold with and include knob 20 attached to connecting member 11. This configuration can be desirable when soldering iron 1 is for personal or home use. Alternatively, soldering iron 1 may be sold or provided without knob 20 so as to restrict changes in the temperature setting. This configuration can be desirable when soldering iron 1 is for industrial use.

Figure 9:
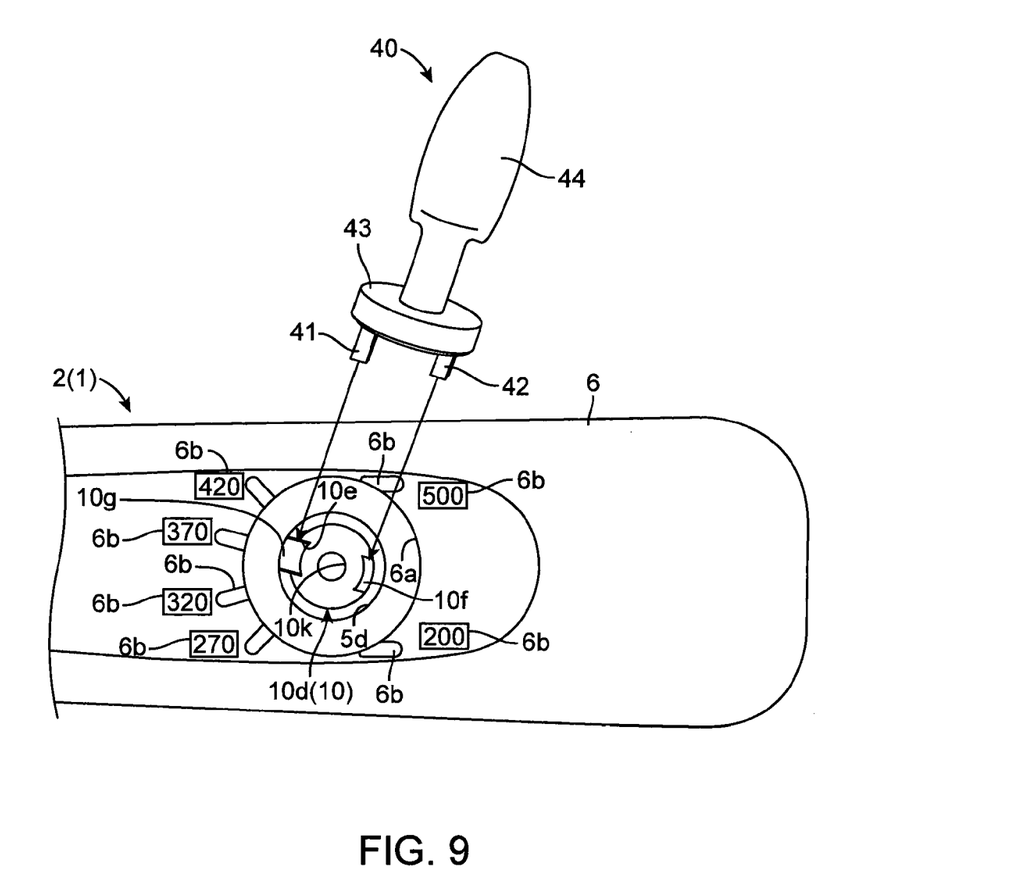
FIG. 9 is a perspective view showing a key or handle for adjusting temperature.

In some embodiments as shown in FIG. 9, soldering iron 1 may include temperature adjustment handle 40. Temperature adjustment handle 40 may be sold together with or separately from soldering iron 1. Temperature adjustment handle 40 is another example of an operating member which the operator uses to make a change to the temperature setting. Temperature adjustment handle 40 can be used as an alternative to knob 20.

Temperature adjustment handle 40 includes first projection 41 and second projection 42 having the same function and configuration as first and second projections 22 and 23, respectively, of knob 20. First projection 41 and second projection 42 protrude from disk shape body 43. Handle 40 can be a single, unitary piece that includes first projection 41, second projection 42, rod-shaped grip 44, and disk shape body 43. Temperature adjustment handle 40 is used to press down arm 10g and unlock connecting member 11 in order to adjust the temperature setting. Temperature adjustment handle 40 is removable and can be kept in the possession of a supervisor to prevent an operator of soldering iron 1 from making unauthorized changes to the temperature setting.

The casing is not limited to what has been described above. In other embodiments, inner casing 5 and the outer casing 6 form a unitary casing structure, configured integrally on front and back sides.

In the embodiments discussed above, soldering iron 1 was shown as an example of a solder handling assembly. In other embodiments the solder handling assembly is a desoldering device or hot air device for heating solder.

In the embodiments discussed above, the casing of soldering iron 1 contains variable resistor 7.

In other embodiments, the casing is part of a control unit which is separate and external to soldering iron 1. For example, the solder handling assembly shown in FIG. 10 includes soldering iron 1 having no internal variable resistor for adjusting temperature. The solder handling assembly includes control unit 50, external to soldering iron 1, to control the temperature setting of soldering iron 1. The temperature adjustment feature TA, such as shown in FIGS. 2 and 3, is located on control unit 50 as opposed to being located on soldering iron 1.

Figure 10:
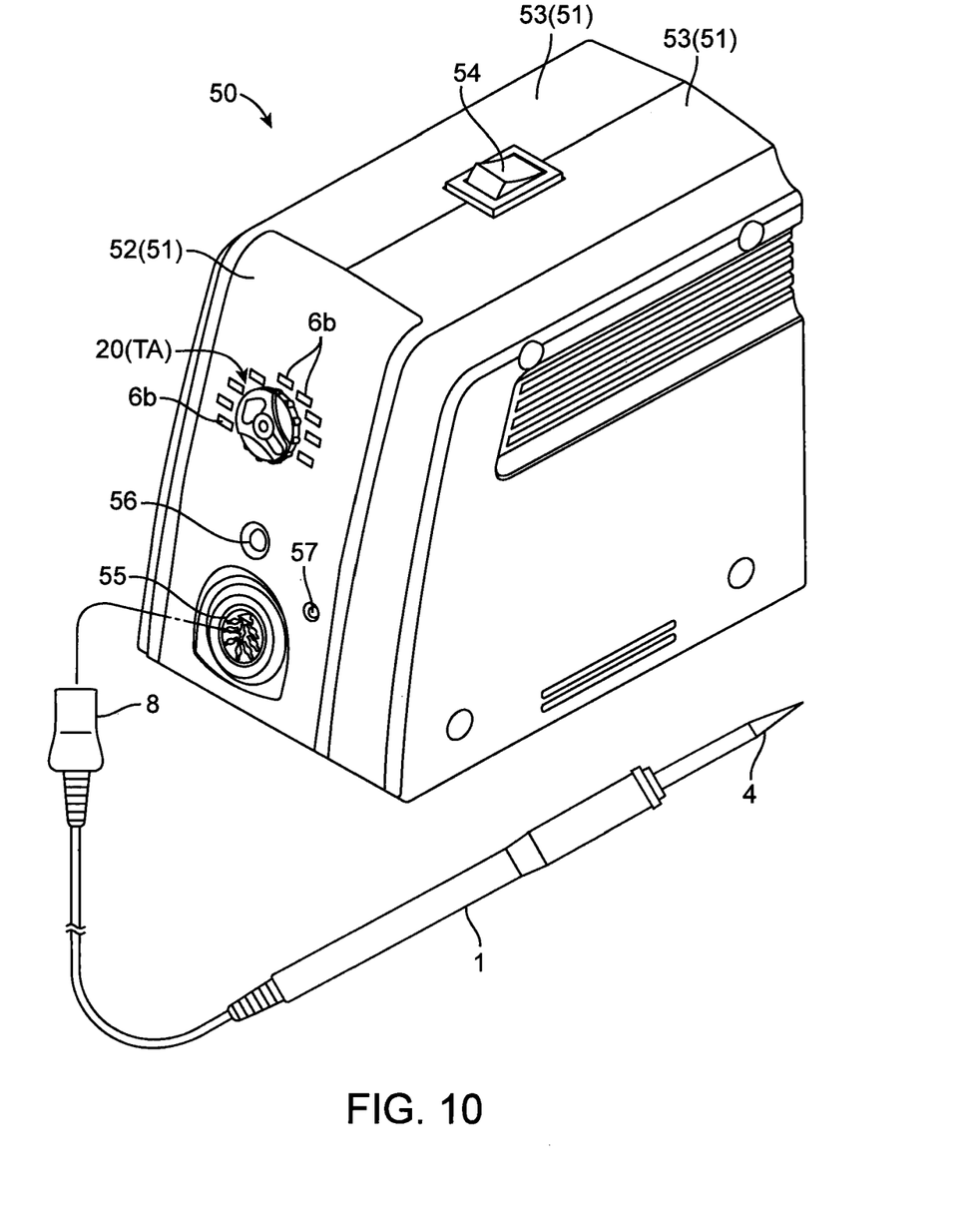
FIG. 10 is a perspective view showing a solder handling assembly.

Control unit 50 is used with soldering iron 1 connected to the unit and controls the temperature of the heater portion inside soldering iron 1. In other embodiments, soldering iron 1 is replaced by a desoldering device or a hot air device for melting solder.

As shown in FIG. 10, control unit 50 includes rectangular casing 51, which includes front panel 52 and two side panels 53. Front panel 52 covers the front and supports control circuitry within casing 51. Side panels 53 cover the side and back. Casing 51 and particularly front panel 52 are examples of a casing in some embodiments of the present invention.

Switch 54 is disposed on the top of casing 51. A power cord (hidden from view) extends out from the back of casing 51. Socket 55 for connecting soldering iron 1 to control unit 50, is disposed on the lower side of front panel 52. Plug 8 at the end of cord 3 of soldering iron 1 connects to socket 55. The control circuitry is electrically connected to the heater portion of soldering iron 1 via plug 8. The control circuitry controls the temperature of tip 4. Power lamp 56 is disposed above socket 55 and is adapted to illuminate when the power is on.

In FIG. 10, temperature adjustment feature TA is principally the same as the temperature adjustment feature TA described in connection with FIG. 2 through FIG. 9. With the embodiment of FIG. 10, temperature adjustment may easily be operated by rotating knob 20. By removing knob 20, the temperature setting may be locked. A supervisor in possession of knob 20 may change the temperature setting when required.

As described above, it is possible to hold down arm 10g with first key projection 22 provided on knob 20 by screwing down knob 20 with screw 30. The present invention is not limited to such a configuration.

Figure 11:
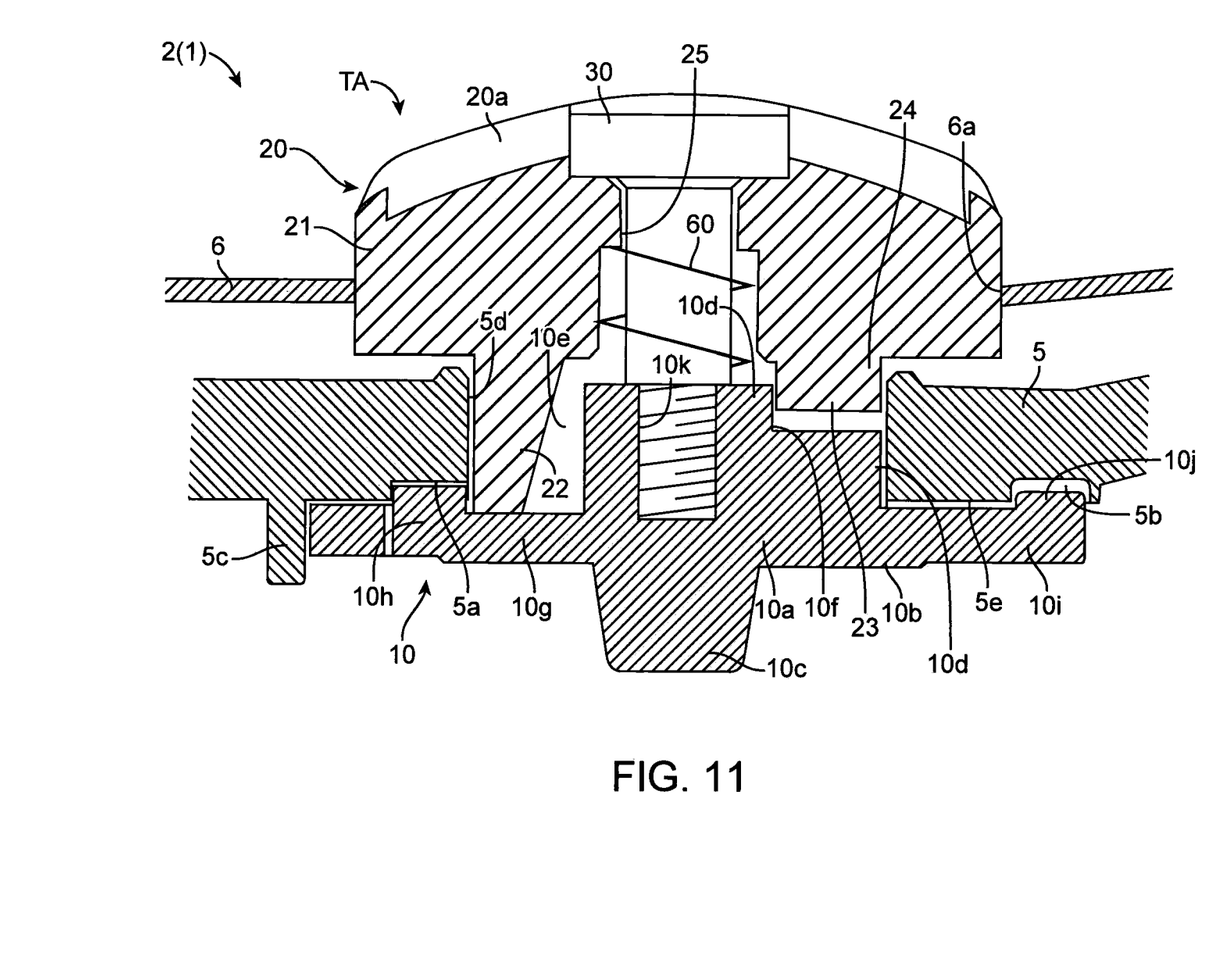
FIG. 11 is a cross-section view showing a temperature adjustment feature.

In other embodiments, as shown for example in FIG. 11, first and second key projections 22 and 23 are configured to change back and forth between a first position in which key projection 22 keeps arm 10g at a first state (corresponding to locked status) and a second position in which key projection 22 presses arm 10g down to a second state (corresponding to unlocked status). Locked status refers to when a change in temperature setting by rotation of connecting member 11, via knob 20 or handle 40, is prevented. Unlocked status refers to when a change in temperature setting by rotation of connecting member 11, via knob 20 or handle 40, is possible.

Referring to FIG. 11, elastic member 60, such as a coil spring, is placed between connecting member 11 and a portion of knob 20. Elastic member 60 biases or urges knob 20 so that first and second key projections 22 and 23 are in the first position discussed above. Knob 20 can be pushed down or inward toward connecting member 11, so that elastic member 60 is compressed and first and second key projections 22 and 23 move to the second position discussed above. Thus, elastic member 60 prevents connecting member 11 from being rotated until the operator pushes down on knob 20 to move arm 10g to the deformed state. As compared to conventional temperature adjustment features in some solder handling assemblies, the configuration shown in FIG. 11 decreases the probability that knob 20 could be accidently rotated and thereby decreases the probably that the temperature setting could be changed unintentionally.

In the illustrated embodiments, the lock element in the form of projection 10h is a solid cube-shaped projection. In other embodiments, the lock element has other shapes. For example, the lock element can be a hook-like projection with a sideways U-shaped configuration.

In other embodiments, the number of the latch elements (recesses 5a being non-limiting examples) is not restricted to eight. There can be any number of latch elements corresponding to the desired number of temperature settings to be made available. The number of second latch elements (hexagonal recesses 5b being non-limiting examples) would match the number of first latch elements.

The various latch elements may be recesses with a bottom surface, as in the illustrated embodiments. In other embodiments, the various latch elements may be through holes formed entirely through the casing.

The latch elements provided on the casing can be integrally formed to the casing or coupled indirectly to the casing.

In some embodiments, arm 10g is an elastic member that is integrally formed with boss 10d. In alternative embodiments, arm 10g is a separate piece that is attached to boss 10d or body 10a. For example, arm 10g can be made of metal or other material different than that of boss 10d and body 10a.

Arm 10g of knob below member 10 is an example of an elastic-resilient member in some embodiments of the present invention. The elastic-resilient member can be something other than arm 10g. An alternative example of an elastic-resilient member is a spring member disposed between knob below member 10 and variable resistor 7. The spring member biases or urges knob below member 10 toward inner casing 5 so that locked status is maintained until the operator applies an axially inward pushing force to the knob below member 10. When the operator applies an axially inward pushing force to the knob below member 10, such as by using knob 20 or handle 40 or other device, the spring member is compressed which allows the entire knob below member 10 to move in the direction of the applied force away from inner casing 5, which results in unlocked status.

In the illustrated embodiments, first and second keyholes 10e and 10f are examples of key receiving portions.

In alternative embodiments, the key receiving portions are omitted. Even in this case, to unlock the temperature setting, the operator would have to press the elastic portion positively or intentionally.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A solder handling assembly comprising:
a heating portion;
a casing;
a variable resistor configured to change a temperature setting of the heating portion; and
a connecting member coupled to the variable resistor, the connecting member at least partially disposed within the casing, the connecting member rotatable about a rotational axis relative to the casing and configured to adjust the temperature setting by the variable resistor when the connecting member is rotated relative to casing,
wherein the connecting member includes an elastic-resilient member movable from a first state to a second state and further includes a first engagement device fixed on the elastic-resilient member, wherein the casing includes a plurality of first opposing engagement members, each first opposing engagement member fixed on the casing at a position different from that of the other first opposing engagement members,
wherein when the elastic-resilient member is in the first state, the first engagement device is engaged to any one of a plurality of the first opposing engagement members coupled to the casing, the engagement device prevents the first engagement device from rotating from the position of the first opposing engagement member to which the first engagement device is presently engaged, to another one of the plurality of positions, and prevents the connecting member from rotating about the rotational axis relative to the casing,
wherein when the elastic-resilient member is in the second state, the first engagement device is disengaged from the plurality of positions of the first opposing engagement members, the disengagement allows the first engagement device to rotate from the position of the first opposing engagement member to which the first engagement device was previously engaged, to another one of the plurality of positions, and allows the connecting member to rotate about the rotational axis relative to the casing,
wherein the elastic-resilient member is in the form of an arm radially extending from a central portion of the connecting member, and the first engagement device is fixed at an end of the arm,
wherein the connecting member includes a key receiving portion configured to receive, from outside the casing, a key projection having a shape that fits within the key receiving portion; and
an operating member, wherein the operating member includes the key projection configured to push the elastic-resilient member from the first state to the second state.

2. The solder handling assembly of claim 1, wherein the second state of the elastic-resilient member corresponds to an elastically deformed state of the elastic-resilient member, and the first state of the elastic-resilient member corresponds to a free state of the elastic-resilient member before being elastically deformed.

3. The solder handling assembly of claim 1, wherein the connecting member includes a boss, the key receiving portion is a slot in the boss, and the slot is configured to receive the key projection.

4. The solder handling assembly of claim 1, wherein the casing forms a grip.

5. The solder handling assembly of claim 1, wherein the first opposing engagement members are latch elements, the first engagement device is a lock element configured to individually engage the latch elements, and the latch elements correspond to different temperature settings of the heating portion.

6. The solder handling assembly of claim 5, wherein the lock element is a projection, and each latch element is a recess configured to receive the projection.

7. The solder handling assembly of claim 1, wherein the connecting member further includes a second engagement device, and the solder handling assembly further includes a second opposing engagement device coupled to the casing, wherein the second engagement device and the second opposing engagement device provide detents in rotation of the connecting member relative to the casing, and each detent is a change in rotating resistance in the rotation of the connecting member relative to the casing.

8. The solder handling assembly of claim 7, wherein the second opposing engagement device includes a plurality of second latch elements, the second engagement device includes a second lock element configured to engage the second latch elements on an individual basis when the connecting member is rotated relative to the casing, and the second latch elements correspond to different temperature settings of the heating portion.

9. The solder handling assembly of claim 1, wherein the operating member is configured to be attached to and removed from the connecting member.

10. The solder handling assembly of claim 1, wherein the operating member is a knob attached to the connecting member, and the casing is disposed between a portion of the knob and a portion of the connecting member.

11. The solder handling assembly of claim 10, wherein the knob is fixed at a state in which the key projection continually pushes the elastic-resilient member to the second state.

12. The solder handling assembly of claim 11, further comprising a screw, wherein the screw fixes the knob at the state in which the key projection continually pushes the elastic-resilient member to the second state.

13. The solder handling assembly of claim 1, wherein the plurality of positions are angular positions centered on the rotational axis of the connecting member.

* * * * *